Figure 4:
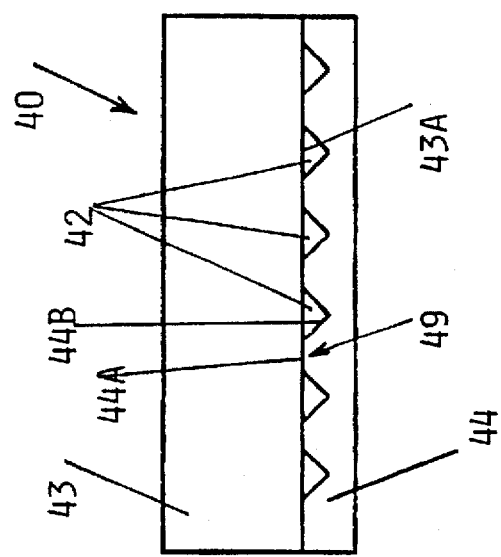

United States Patent [19]
Hanneborg et al.

[11] Patent Number: 5,744,727
[45] Date of Patent: Apr. 28, 1998

[54] PRESSURE GAUGE

[75] Inventors: Anders Hanneborg, Fetsund; Fin Serck-Hanssen, Hovik; Per Ohlckers, Nesbru, all of Norway

[73] Assignee: Sinvent A/S, Trondheim, Norway

[21] Appl. No.: 716,143

[22] PCT Filed: Mar. 3, 1995

[86] PCT No.: PCT/NO95/00048
§ 371 Date: Dec. 9, 1996
§ 102(e) Date: Dec. 9, 1996

[87] PCT Pub. No.: WO95/24624
PCT Pub. Date: Sep. 14, 1995

[30] Foreign Application Priority Data

Mar. 7, 1994 [NO] Norway .................... 940785

[51] Int. Cl.⁶ .................................... G01L 7/02
[52] U.S. Cl. ........................ 73/733; 73/700; 73/718
[58] Field of Search ............. 73/718, 724, 721, 73/727, 732, 733, 737

[56] References Cited

U.S. PATENT DOCUMENTS

| | | | |
|---|---|---|---|
| 3,858,097 | 12/1974 | Poyle | 73/724 X |
| 4,168,518 | 9/1979 | Lee | 73/724 X |
| 4,177,496 | 12/1979 | Bell et al. | 73/724 X |
| 4,589,054 | 5/1986 | Kuisma | 73/718 X |
| 4,628,403 | 12/1986 | Kuisma | 73/718 X |
| 4,984,467 | 1/1991 | Haefner | 73/729.2 X |
| 5,024,097 | 6/1991 | Graeger et al. | 73/727 |
| 5,024,098 | 6/1991 | Petitjean et al. | 73/729.2 |
| 5,207,767 | 5/1993 | Delatoore | 73/724 X |
| 5,440,931 | 8/1995 | Wiegand et al. | 73/724 |
| 5,483,834 | 1/1996 | Frick | 73/724 |

FOREIGN PATENT DOCUMENTS

| | | | |
|---|---|---|---|
| 1527-529-A | 12/1989 | Russian Federation | 73/724 |

*Primary Examiner*—William L. Oem
*Assistant Examiner*—Paul D. Amrozowicz
*Attorney, Agent, or Firm*—Eckert Seamans Cherin & Mellott

[57] ABSTRACT

Pressure gauge for very high pressures based upon a principle similar to the Bourdon tube, comprising a beam-shaped measuring element having an elongate cavity lying eccentrically in the cross section of the measuring element, and being supported by a holder member at one end. The measuring element is composed of two substantially plate-shaped parts manufactured in planar technology, preferably of silicium or quartz. One plate part is provided with an elongate recess in that surface which faces against a cooperating surface on the other plate part, so as to form the eccentric cavity. Both plate parts are jointed at the surfaces in such a manner that the cavity is sealingly closed. The measuring element is adapted to be subjected exteriorly to the very high pressures to be measured.

13 Claims, 2 Drawing Sheets

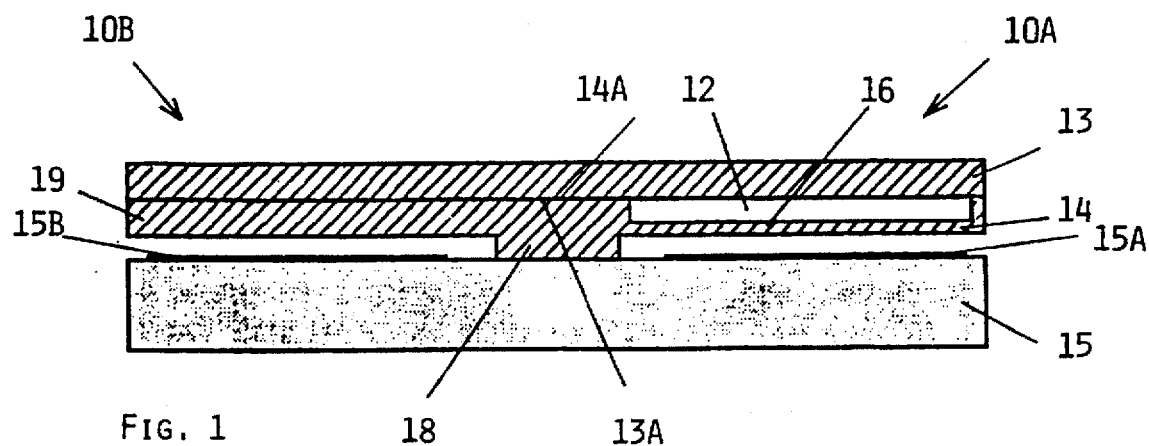
FIG. 1
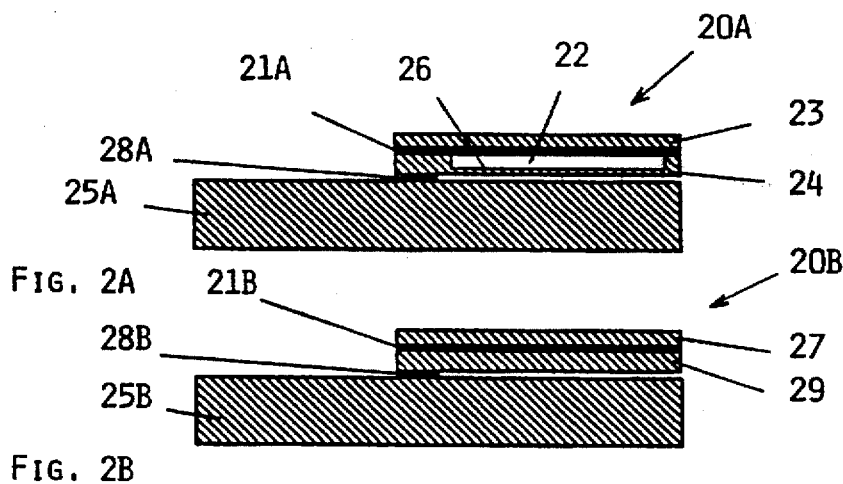
FIG. 2A
FIG. 2B
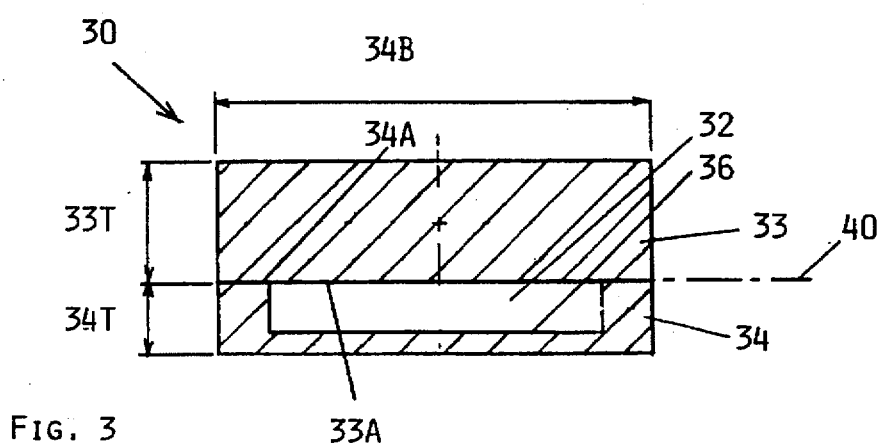
FIG. 3

PRESSURE GAUGE

This invention relates to a pressure gauge for very high pressures and based upon a principle similar to the bourdon tube, comprising a substantially straight, beam-shaped measuring element having one or more elongate cavities lying eccentrically in the cross-section of the measuring element, and possibly being supported by a holder member at one end.

When very high pressures are referred to here, these can typically be of the order of magnitude 1000 bar. Moreover for interesting uses of such a pressure gauge it is of significance that the ambient temperatures can be rather high, typically 200° C, while at the same time the pressure gauge should have small geometrical dimensions.

A pressure gauge in the principle consists of a spring element and a measuring or sensor device. Common pressure gauges or transducers being commercially available and based upon silicium technology can employ silicium membranes as spring element, provided with diffused piezo-resistors as sensor devices. Such resistors however, are not suitable for high ambient temperatures. Capacitive sensor devices on silicium membranes will not have a sufficiently large deflection if they shall be dimensioned for high pressures. In summary the known spring elements being used for measuring moderate pressures, such as membranes and bourdon tubes are poorly suited for high pressures, if they shall be employed together with a measuring or sensor device based upon the detection of movement, because the absolute movement is small when the spring element shall be small.

The present invention takes advantage of the long well known bourdon tube principle, which previously has been utilized in various configurations for pressure measurement. A specific example in the form of a bourdon barometer or microbarometer is described on page 459 in "Handbok i finmekanik", K G Bertmarks Förlag Aktiebolag, Sweden. The measuring element in this known, somewhat special barometer consists of a bent spiral shaped and evacuated metal tube, one end of which is attached to a holder member or frame.

In practical applications contemplated in connection with the present invention, in particular the very high pressures and the small dimensions desired, quite different solutions are required however, than in the microbarometer just mentioned.

Within classical pressure measurements it has long since been known that an eccentrically bored bourdon tube is a well suited spring element for measurement of high pressures. Such pressure gauges are described by: J. Wuest: Theorie des Hochdruckmessrohres mit ausmittiger Bohrung; Ingenieurarchiv XIX Band 1951 and J. Gielessen: Elastisches Stabmanometer mit exzentrischer Bohrung für Drucke bis 9500 kp/cm2; Zeitschrift für angewandte Physik BAnd 8 Heft 4, 1956.

These known forms of pressure transducers intended for high pressures, all have the pressure medium concerned, introduced interiorly. The essentially straight, beam-shaped measuring or spring element with an elongate eccentric cavity, under pressure influence will assume a curvature or deflection being proportional to the pressure applied. These known forms of pressure gauge or transducers can be regarded as representing the closest technical background for the present invention.

In view of the above discussed, known techniques, a pressure gauge as referred to in the introduction to this description, has novel and specific features consisting primarily therein that the measuring element is composed of two substantially plate shaped parts manufactured in planar technology, preferably of silicium or quartz, that one plate part is provided with an elongate recess in that surface which faces against a cooperating surface on the other plate part, so as to form the eccentric cavity (cavities), that both plate parts are jointed at said surfaces in such a manner that said cavity (cavities) is (are) sealingly closed, and that the measuring element is adapted to be subjected exteriorly to the very high pressures to be measured.

Thus the invention has taken advantage of the known measurement principle as discussed, by assembling the eccentric bourdon tube in a new way, i.e. by employing micromechanical manufacturing techniques, namely planar technology which is well developed for inter alia silicium as the main material. The two plate-shaped parts are assembled into a beam-like measuring element, preferably by means of anodic bonding, which gives a strong and creep-free connection, so that the measuring or spring element as a whole will act as a unitary, integral beam consisting of one piece of material, the material being preferably silicium. The eccentric cavity can either be filled with gas at atmospheric pressure or it can be evacuated.

Examplary embodiments of the pressure gauge according to the invention shall be described more closely below with reference to the drawings, whereby also additional specific features and advantages of the pressure gauge will appear from the following description.

Figure 5:
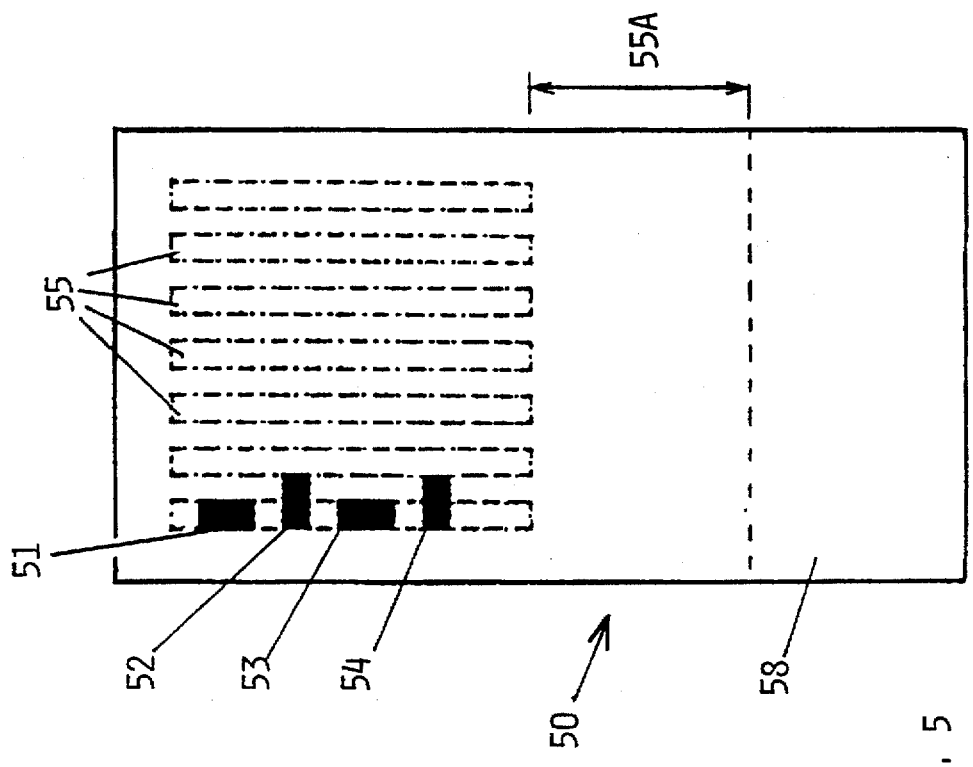

FIG. 1 shows a simplified longitudinal section of a first example of a pressure gauge having a measuring element and a reference element supported by a holder member or base member which can here consist of pyrex glass, FIG. 2A/2B in the principle show a pressure gauge as in FIG. 1, but the active measuring element (FIG. 2A) is mechanically and electrically separated from the reference element (FIG. 2B), FIG. 3 at a somewhat enlarged scale shows a cross sectional shape of the measuring element, as this e.g. can be incorporated in the embodiments of FIG. 1 and FIG. 2A, FIG. 4 in enlarged cross section shows a preferred embodiment of the measuring element according to the invention, and FIG. 5 in plan view shows a measuring element according to the invention, provided with piezoresistive sensor devices.

The pressure gauge or transducer shown as an example and schematically in longitudinal section in FIG. 1, comprises a beam-like measuring element 10A having a free (right hand) end, whereas the opposite end is attached to a holder or base member 15 through an intermediate piece 18. This intermediate piece 18 can also be regarded as an integrated part of the base member 15. The measuring beam 10A comprises a sealed, elongate cavity 12, which is formed in a particular manner, as will be described below.

As an extension of the measuring element 10A and located somewhat symmetrically thereto in relation to the intermediate piece 18, there is provided a beam-shaped reference element 10B. Both elements 10A and 10B can have an integrated structure based in the principle on two plate-shaped parts 13 and 14/19. According to the invention these are manufactured in planar technology, preferably of silicium as mentioned above, or possibly of quartz. Also other materials having similar properties and suitable for manufacturing in planar technology, can be contemplated in this use.

Planar technology in this context involves, inter alia, etching of an elongate recess 16 in plate part 14, so as to form the cavity 12 by joining plate part 14 and plate part 19 of the reference element, to the common overlying plate part 13, as illustrated in FIG. 1. Cooperating surfaces as shown at 13A and 14A respectively on the pair of plate parts, are joined preferably by anodic bonding, so that the cavity 12 will be sealingly closed in a pressure tight manner. In a normally subsequent operation the assembled beam-shaped measuring element 10A with reference element 10B will be bonded to holder member 15, which in this embodiment can be made of glass, e.g. Pyrex 7740.

The cavity 12 will represent a reference pressure, such as the atmospheric pressure, or a vacuum reference; and when the ambient pressure at the outside of the measuring element acts thereon, a centric force will act axially on the measuring element 10 when cavity 12 is eccentrically located therein, so that a bending moment will be generated in the measuring element, with the result that a deflection thereof will take place. The assembled measuring element or spring element accordingly will be curved when the ambient pressure increases. The degree of curvature will increase in proportion to the pressure difference between the pressure outside the measuring element and the pressure in cavity 12. If this cavity is evacuated the curvature of the measuring element therefore will be proportional to the absolute ambient pressure.

The deflection or curvature of measuring element 10A can be measured in various ways. In the embodiment described here the degree of curvature is measured in the form of a capacitance measurement. As will be seen from FIG. 1 capacitor elements 15A and 15B respectively are provided on the upper side of holder member 15 for cooperation with the underside of the measuring element 10A and the reference element 10B respectively. When these elements consist of electrically conductive material such as silicium, there is no need for any separate capacitor element or coating for cooperation with the capacitor elements at the upper side of holder member 15. During pressure measurement changes in the capacitance of the capacitor 15A/14 is compared to the capacitance of the reference capacitor 15B/19, which is formed in a way analogus to the capacitor first mentioned.

Thus the two plate parts 13 and 14/19 preferably consist of the same material, i.e. silicium, whereas holder member 15 here is considered to consist of an electrically insulating material, namely glass. This design with a holder member of glass, may have the drawback of not having sufficient mechanical stability when strict requirements are imposed as to the longterm stability in applications where high temperatures occur. Therefore it is preferred that the holder member consists of the same material as the measuring element, or also the reference element, in particular silicium. In such case there must be provided for electrical insulation between the measuring element, the reference element respectively, and the associated holder member. Such an embodiment will be discussed more closely with reference to FIGS. 2A and 2B.

The actual measuring element 10A and besides the reference element 10B, can also in the principle be composed of plate parts consisting of different materials, but this may lead to undesired deformations under the influence of the ambient pressure. When considering bending only, a beam-shaped measuring element composed of two different materials can however be approximately considered equivalent to another beam consisting of only one single material.

In a practical design of a pressure gauge as illustrated in the principle in FIG. 1, the outer dimensions can be of magnitudes 17,5 mm×3,5 mm×1,5 mm. These dimensions can be smaller if the sensor devices for sensing the bending of the measuring element under pressure application, are based on other effects than the capacitive measurement described here. A measuring element with dimensions given in the example above, can be designed for a maximum ambient pressure of 1000 bar or more, such as up to 2500 bar. The lower pressure limit for sufficiently accurate measurement can be from 100–500 bar. The pressure ranges of interest for the measurement may of course vary significantly, depending upon the intended use, with corresponding adjustment of relative dimensions and other design parameters for the pressure gauge.

In the embodiment of FIGS. 2A and 2B the holder member 25A for the measuring element 20A (FIG. 2A) and the corresponding holdler member 25B for the reference element 20B (FIG. 2B), are considered to be made of an electrically conductive material similar to the material in the measuring element and the reference element respectively. More specifically it is preferred also here to use silicium.

The solution in FIGS. 2A and 2B thus is based on a mechanical separation of the pressure active sensor part (FIG. 2A) and the passive reference part (FIG. 2B). This structure solves the combined electrical-mechanical problems in this connection, and moreover has the advantage that the design is relatively simple. More in detail FIG. 2A shows a measuring element 20A which is mounted on the holder member 25A with an insulating intermediate element 28A at one end of the beam-shaped measuring element 20A, which is freely cantilevered at its opposite end. The element is composed of two plate shaped parts 23 and 24, whereby the latter part has a recess 26 which delimited by plate part 23 provides for the forming of the elongate, eccentric cavity 22. For joining the pair of plate parts 23 and 24 it is an advantage to employ thin joint seams of pyrex glass for anodic bonding. This bonding or joint is shown at 21A in FIG. 2A. The thickness of joint seam 21A is much exaggerated in this schematic figure of drawing.

Quite correspondingly FIG. 2B shows a reference element 20B which with an intermediate element 28B is mounted on holder member 25B. Two plate-shaped parts 27 and 29 are joined with a thin seam 21B of pyrex glass so as to form an integrated beam for serving as a reference in relation to the measuring element 20A in FIG. 2A. Although the unit in FIGS. 2A and 2B respectively, are mechanically and electrically separated, they will be mounted closely adjacent each other in a complete pressure gauge, for cooperation as explained.

FIG. 3 schematically shows a preferred cross sectional shape of a measuring element, such as measuring element 10A and 20A in FIG. 1 and FIG. 2A respectively. The beam cross section in FIG. 3 is composed of a plate part 33 and another plate part 34 having a recess 36 so as in combination with plate part 33 to form a cavity 32. The cooperating or joined surfaces of the two plate parts are referred to as 33A and 34A respectively. The joining plane is indicated specifically at 40, and advantageously corresponds approximately to the neutral zone or axis of the measuring element when bending under pressure application as discussed above. This has the advantage, inter alia, that the joint itself will not be subjected to the highest stresses during deflection of the measuring element 30. The position of the neutral zone during bending will depend upon the relative dimensions, in particular the thickness of the respective plate parts 33 and 34 as well as the cross sectional shape of the recess 36.

As will appear from FIG. 3 it is preferred to have a generally rectangular cross section of the plate-shaped parts 33 and 34 as well as of the resulting, beam-like measuring element 30, whereby the thickness 33T and 34T respectively of the plate parts preferably is small in relation to the width 34B. With such relative geometric dimensions the structure would be well suited for manufacturing with planar technology. This also applies to the cavity 32, which likewise has a preferably rectangular and somewhat flattened cross section, with an orientation corresponding to the cross sectional shape of the measuring element 30 as a whole.

As mentioned above, the pressure in the closed cavity 32 can be equal to the atmospheric pressure (1 bar), or 0 bar (evacuation), if measurement of absolute pressure is desired. Because the resultant force which is exerted by an ambient pressure on the beam cross section, does not coincide with the neutral axis or zone 40 of the cross section, there will be generated a bending moment which deforms the measuring beam 30, as described previously. In this connection there is reason to take into account the fact that the deformation induced in the beam structure by the bending moment, will have the effect of increasing the bending moment.

In relation to the embodiments shown and described, there may be contemplated various modifications without departing from the fundamental framework of the invention. This applies, inter alia, to the cross sectional shape of the eccentric cavities described, which instead of having a unitary rectangular shape, can consist of one or more bores being e.g. circular, whereby the remaining beam cross section of the measuring element can anyhow be rectangular. The actual making of recesses for the cavities 12, 22 and 32 shown, normally in planar technology will take place by etching, but it is obvious that also other working methods may be employed, e.g. mechanical cutting or milling.

As a particularly preferred embodiment the cross section in FIG. 4 shows a number of cavities 42 with a channel-like form arranged in the longitudinal direction of the measuring element 40 shown therein. An upper plate part 43 is joined to a lower plate-shaped part 44 which is provided with recesses in the form of a number of parallel grooves 44B which together with the underside 43A of plate part 43, confine the channel-shaped cavities 42 mentioned. The surface or underside 43A of plate part 43 is joined to longitudinal surface portions 44A on plate part 44, as indicated at 49 in FIG. 4. The recessed grooves 44B advantageously can have a rounded cross sectional shape in view of desired mechanical strength.

A substantial advantage obtained with the embodiment of FIG. 4 is that the cavities 42 obtained, are not to any significant degree subjected to membrane-like deflection under the influence of the very high exterior pressure, as will be the case in the embodiments of FIGS. 1-3.

The anodic bonding which constitutes an important feature according to the invention, is a joining process being well known per se, and can either be electrostatic bonding (field assisted glass bonding) or fusion bonding, also referred to as direct bonding.

In FIGS. 1-3 of the drawings there is not shown any electronic measurement circuit for obtaining electrical signals corresponding to the capacitance changes in the capacitors described, but possible structures of such circuits will be obvious to an expert in the field. Read-out of the capacitance of the capacitors, being of the order of magnitude of a few picofarads, can take place in particular by establishing a bridge configuration, whereby the read-out electronics should be located in immediate proximity of the capacitor in order to avoid large stray capacitances. This means that the measurement electronics should be located within the pressure medium with pressure-tight sleeves.

As an interesting alternative to capacitive sensor devices according to FIGS. 1 and 2, piezoresistive sensor devices can be employed, as illustrated in FIG. 5. Measuring element 50 therein is provided at suitably selected locations with piezoresistive sensor devices 51, 52, 53 and 54. The positions of such piezoresistive sensors can be determined according to common practice, so that there is obtained an optimal combined output signal, e.g. by bridge connection of sensor devices 51, 52, 53 and 54. Under certain conditions it can be favourable to locate these piezoresistive sensor devices in pairs at an angular spacing, as shown for sensor pairs 51/52 and 53/54 respectively.

Separate cavities 55 formed in the principle in the same way as in the cross section of FIG. 4, are shown in dotted lines in FIG. 5. These channel shaped cavities 55 extend over a portion of the length of the measuring element 50, to a distance indicated at 55A from a support at holder member 58 at the lower end of measuring element 50 as it is illustrated in FIG. 5. Such an arrangement involves that the bending of the measuring element and thereby the effect on the piezoresistive sensors 51–54 in the region at the channels or cavities 55, is not influenced or interferred by the clamping or other form of attachment of the measuring element at the end portion or support 58.

We claim:

1. A pressure gauge for very high pressures and based upon a principle similar to the bourdon tube, the pressure gauge comprising:

a substantially straight, beam-shaped measuring element having at least one elongate cavity lying eccentrically in the cross section of the measuring element;

a holder member at one end of the gauge, the measuring element being supportable by the holder member;

wherein the measuring element is composed of two substantially plate-shaped parts manufactured in planar technology and including material therein selected from the group consisting of silicium or quartz, the plate-shaped parts having cooperating surfaces, an elongate recess in the surface of one of the plate-shaped parts which faces the surface of the other plate-shaped part so as to form the eccentric cavity both plate-shaped parts being joined at said surfaces in such a manner that said cavity is sealingly closed, and the measuring element being deflected when subjected exteriorly to the very high pressures to be measured.

2. The pressure gauge according to claim 1, wherein both plate-shaped parts have a generally rectangular cross section with a significantly larger width than thickness.

3. The pressure gauge according to claim 1, wherein the cavity has a rectangular cross section which is somewhat flattened and is oriented with its width dimension corresponding to the width of the plate-shaped parts.

4. The pressure gauge according to claim 1, wherein the holder member for the measuring element consists of the same material as the measuring element, and the material comprises silicium.

5. The pressure gauge according to claim 1, wherein the recess has the form of a number of parallel grooves for providing cavities in the form of channels in the longitudinal direction of the measuring element.

6. The pressure gauge according to claim 5, wherein said surfaces are joined at longitudinal portions between the channels.

7. The pressure gauge according to claim 5, wherein said parallel grooves have a rounded cross sectional shape.

8. The pressure gauge according to claim 1, comprising a plurality of said cavities, wherein the measuring element includes a free end, an end opposite the free end, and a support at the holder member, and wherein said cavities are formed over a portion of the length of the measuring element extending from adjacent the free end of the element to a distance from the support of the element at the holder member at the opposite end.

9. The pressure gauge according to claim 1, wherein, for sensing of bending of the measuring element under pressure application, the gauge further comprises piezo-resistive sensor devices located at such portions of the measuring element that an optimal output signal is obtainable by bridge connection of several of the piezo-resistive sensor devices.

10. The pressure gauge according to claim 1, wherein, for sensing of bending of the measuring element under pressure application, the gauge further comprises capacitive sensor devices located on mutually opposing surfaces of the measuring element and a holder member, respectively.

11. The pressure gauge according to claim 1, further comprising a reference element having substantially the same structure as the measuring element but without the cavity, the reference element having a reference element holding member which is separated at least electrically from the measuring element and its holder member, the holder members consisting of electrically conductive material.

12. A pressure gauge for very high pressures and based upon a principle similar to the bourdon tube, the pressure gauge comprising:

a substantially straight, beam-shaped measuring element having at least one elongate cavity lying eccentrically in the cross section of the measuring element;

a holder member at one end of the gauge, the measuring element being supportable by the holder member;

wherein the measuring element is composed of two substantially plate-shaped parts manufactured in planar technology and including material therein selected from the group consisting of silicium or quartz, the plate-shaped parts having cooperating surfaces, an elongate recess in the surface of one of the plate-shaped parts which faces the surface of the other plate-shaped part so as to form the eccentric cavity both plate-shaped parts being joined at said surfaces in such a manner that said cavity is sealingly closed, and the measuring element being adapted to be subjected exteriorly to the very high pressures to be measured, wherein both plate-shaped parts have a generally rectangular cross section with a significantly larger width than thickness, and wherein the measuring element has a cross section which includes a neutral zone, and wherein the thickness of the respective plate-shaped parts and the dimensions of the recess are such that the neutral zone of the measuring element upon bending of the measuring element during pressure application, at least approximately coincides with the joined surfaces.

13. The pressure gauge according to claim 1, wherein the plate-shaped parts are joined by anodic bonding and each of the plate-shaped parts consists of silicium.

* * * * *

UNITED STATES PATENT AND TRADEMARK OFFICE
CERTIFICATE OF CORRECTION

PATENT NO. : 5,744,727
DATED : April 28, 1998
INVENTOR(S) : Anders Hanneborg et al It is certified that error appears in the above-indentified patent and that said Letters Patent is hereby corrected as shown below:

Claim 13, column 8, line 26, delete "claim 1" and insert therefor --claim 12--.

Signed and Sealed this

Seventh Day of July, 1998

Attest:

BRUCE LEHMAN

Attesting Officer

Commissioner of Patents and Trademarks